Aug. 24, 1926.

F. W. MERRILL

ALTERNATOR

Filed Jan. 13, 1925

1,597,453

Inventor:
Frank W. Merrill,
by
His Attorney

Patented Aug. 24, 1926.

1,597,453

UNITED STATES PATENT OFFICE.

FRANK W. MERRILL, OF FORT WAYNE, INDIANA, ASSIGNOR TO GENERAL ELECTRIC COMPANY, A CORPORATION OF NEW YORK.

ALTERNATOR.

Application filed January 13, 1925. Serial No. 2,213.

My invention relates to alternators, and particularly to a new and novel alternator which will directly produce an interrupted current of relatively high frequency with a relatively low frequency of interruption.

It has been the practice in the art of telephony to signal by means of an interrupted current, having a relatively high frequency of say from 137 to 1000 cycle per second and interrupting this high frequency current at a frequency of 20 to 40 cycle per second, thus giving alternate silent and signal periods. The interruption of the current at this low frequency has been accomplished heretofore by means of a mechanical interrupter. Such interrupters have been found difficult to build and maintain.

In accordance with my invention, I generate such an interrupted current directly and thus eliminate all mechanical interrupters. To this end, I construct an alternator with two relatively rotatable members, one of which has a pole and an alternating current winding surrounding the pole, the other of which has teeth and spaces therebetween extending over only a portion of its periphery. With such a construction, the relative rotation of the members produces an alternating current voltage in the alternating current winding during a portion of each revolution of one member with reference to the other and no voltage during another portion of each revolution.

Figure 1:
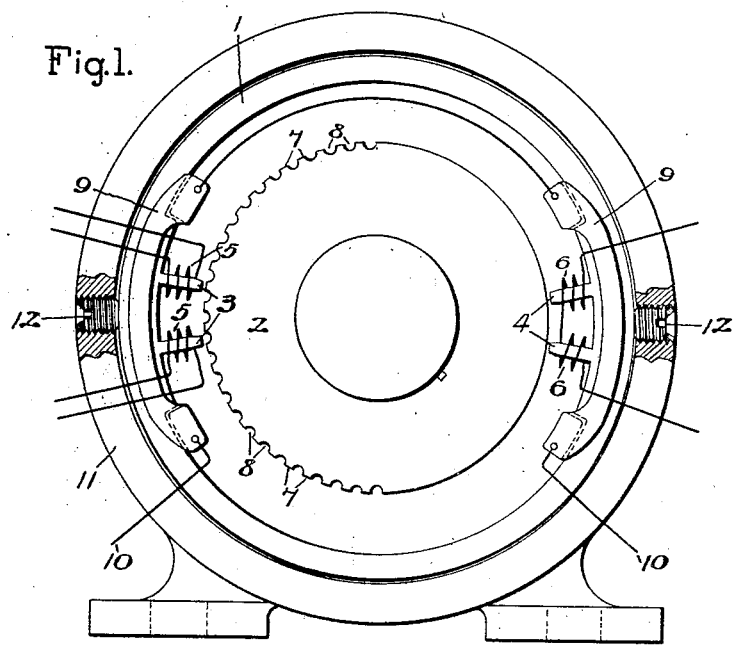
Figure 2:
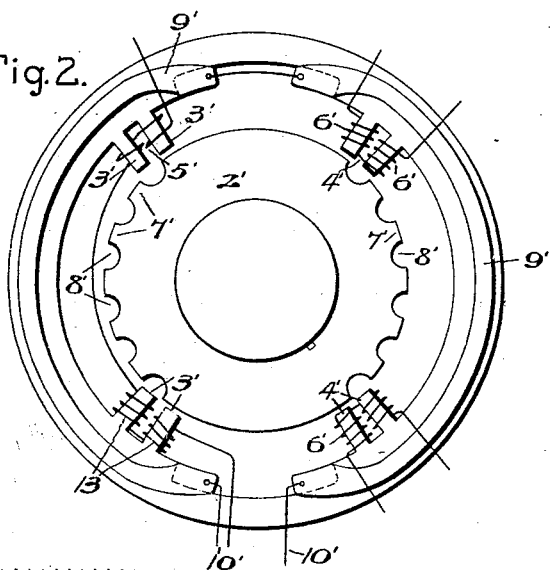
Figure 3:

Other features of novelty which characterize my invention are pointed out with particularity in the claims annexed to and forming a part of this specification. For a better understanding of my invention, reference may be had to the following description taken in connection with the accompanying drawing, in which Fig. 1 is a view of an alternator embodying my invention; Fig. 2 is a view of an alternator embodying a modification, and Fig. 3 is a diagram of the voltage curve of my alternator.

Referring to Fig. 1 of the drawing, the alternator therein shown is of the inductor type and has two relatively rotatable members 1 and 2. The stationary member or stator 1 is shown as having four narrow poles 3 and 4, each of which is surrounded by a winding 5 or 6. The rotatable member or rotor 2 has teeth 7 with spaces 8 therebetween, these teeth and spaces being equally spaced but extending over only a portion of the periphery of the rotor 2. The other portion of the rotatable member is smooth and cylindrical in form. The teeth 7 are substantially equal in width to the width of the poles 3 and 4. A direct current field winding 9 is mounted on the stationary member and is supplied with current from lines 10. The field winding 9 comprises two coils, each surrounding two of the poles on the stationary member. This field winding produces a magnetic flux which flows through the poles 3 and 4 and the teeth 7. In the arrangement shown in this figure, the teeth 7 extend over only one-half of the periphery of the rotatable member, so that the distance between the poles 3 on one side of the stationary member and the poles 4 on the other side is substantially equal to the smooth portion of the rotatable member.

Each of the windings 5 on the poles 3 on the left-hand side of Fig. 1 are shown as connected in an independent circuit. Consider now, one of these windings with the rotatable member in the position shown in Fig. 1: Flux flows from the stationary member 1 through a pole 3 then across the air gap through a tooth 7 on the rotatable member, through the rotatable member to the smooth portion thereof, across the air gap through a pole 4 on the right-hand side of Fig. 1 and back to the stationary member 1. When the rotatable member has moved so that space 8 comes opposite the pole 3 on the left-hand side, very little flux flows therethrough. It will, therefore, be seen that as the toothed portion of the rotatable member passes under this pole 3, the flux through such pole will vary from a maximum to a minimum and then will rise again to a maximum, generating a voltage, in the winding 5 surrounding this pole, of a relatively high frequency during a half revolution. The frequency is equal to twice the number of teeth 7 times the number of revolutions of the rotatable member. Assume that the rotatable member is revolving at 1175 R. P. M., that is, 19.6 R. P. S., and that there are 25½ teeth thereon (51 teeth if they extended completely around the periphery), the frequency of the current generated while the toothed portion of the rotatable member is passing the pole 3 would be 19.6 × 51, that is 1000 cycles per second. When the smooth portion of the rotatable member is passing this pole 3 there will be no variation in the flux passing therethrough and consequently no voltage will be generated in the winding 5, thus interrupting the high frequency current during one-half of each revolution of the rotatable member. With a speed of 1175 R. P. M.— 19.6 R. P. S.—, the interruptions will be at a rate of 19.6 cycle per second.

If the windings about two adjacent poles are connected in series as shown on the right of Fig. 1, the voltage produced will be twice that of a single winding as on the left of Fig. 1, but there will be produced a shaded interruption of tone extending over about three rotor teeth at each end of a half revolution. The voltage wave produced by such a construction is shown in Fig. 3. This connection has the advantage that the alternating current wave of voltage will have fewer harmonics than the wave produced in a single winding connected to a circuit, as shown on the left of Fig. 1. If now the winding 5 on a pole 3 (or the two windings 5 on adjacent poles 3) on the left side of the machine is connected to one circuit and the winding 6 on a pole 4 (or the two windings 6 on adjacent poles 4) on the right side of the machine is connected to another circuit, each circuit will have supplied thereto an interrupted current of relatively high frequency with a relatively low frequency of interruption, the high frequency current being supplied in one circuit while the current in the other circuit is being interrupted, and vice versa.

While the toothed portion of the rotatable member is passing under a pole on one side of the stationary member, it is important that there be no appreciable variation in the flux fed to the poles on the other side of the stationary member by the smooth portion of the rotatable member. Any variation in the flux fed to the poles by the smooth portion of the rotatable member will produce a voltage in the windings surrounding these poles and cause noise in a supposedly quiet circuit. The poles opposite the toothed portions of the rotatable member should therefore as a whole, supply constant flux to the rotatable member, that is, the flux which is rapidly varying in each pole should add up to a constant value. This result is accomplished by making the pitch of the poles equal to a fractional pitch of the rotor teeth, such as 1½, 2½ etc. The pitch shown in Fig. 1 is 2½. This means that when one rotor tooth comes exactly in line with any one stator pole and draws maximum flux through the stator pole, the adjacent stator pole is opposite a space between rotor teeth and in the position of minimum flux.

If the air gap under the poles on the right-hand side of the machine is different from that under those on the left-hand side, the maximum and minimum flux passing through the stator poles on the two sides is different when the toothed portion of the rotatable member passes these stator poles. This will result in a different voltage being generated in the circuits of the windings surrounding the poles on the two sides. In order to insure that the air gap is uniform under the poles on both sides, I mount the stationary member 1 in a frame 11 with sufficient clearance between them to permit movement of the stationary member within the frame without distorting or springing the laminations of the stationary member, and provide set screws 12 engaging the frame and the stationary member. By properly moving these set screws, the air gap and the stator poles on both sides can be made exactly equal.

If a large number of poles are provided on the stationary member and all of such poles are not provided with windings, flux variations would occur in the poles provided with windings, due to the passage of the low reluctance smooth portion of the rotatable member under the idle poles of the stationary member, which would not take place with the arrangement of Fig. 1.

If, however, it is desired to have a large number of independent interrupted circuits, requiring a large number of poles on the stationary member, it is desirable to reduce the diameter of the smooth portion of the rotatable member below that of the outside diameter of the toothed portion. This reduction in diameter should be sufficient to give the same reluctance as the average reluctance of the toothed portion. In this way, the total flux would be substantially constant. If six circuits are desired, the best results would be obtained by winding three circuits on each side, one circuit on each of three poles, or one circuit on each adjacent pair of six poles on each side. Twelve circuits—one on each of twelve poles—could also be provided.

In the modification shown in Fig. 2, the rotatable member is divided into four equal parts, two opposite parts being provided with teeth 7' and spaces 8' therebetween, and the other two opposite parts being smooth. The direct current field winding 9', supplied with current from lines 10', is shown as providing a bi-polar excitation. The two sets of adjacent stator poles 4' on the righthand side of this figure have windings 6' connected in separate circuits, and these windings will have generated therein interrupted high frequency currents, the interruptions occurring twice for each revolution, so that if the rotatable member 2' is revolved at 1175 R. P. M.—19.6 R. P. S.—the interruptions will be at a frequency of 39.2 cycles per second.

The stator poles 3' at the upper part of the left-hand side of Fig. 2 are wound with windings 5' having a different number of turns than the windings 13 on the stator poles 3' at the lower part of the left-hand side, the windings of all of these poles being connected in series. The windings on one set of these poles will have no voltage generated therein when the smooth portion of the rotatable member is passing under them, while the other set of these poles will have a high frequency voltage generated therein, and since the two sets of windings are in series, the voltage supplied to the circuit to which these windings are connected will vary in amount proportional to the number of turns in the respective windings. If these poles were all wound with the same number of turns and connected in series, the voltage supplied the circuit would be an uninterrupted high frequency one, as one set of poles will stop generating at the same time that the other set starts generating, and vice versa. The stator poles in Fig. 2 are narrow and substantially equal in width to the width of the rotor teeth and the pitch of these poles is the shortest possible being equal to one-half of the rotor tooth pitch. This gives the sharpest possible interruption without sacrificing the wave shape or the uniform total flux through the field windings.

Other modifications of my invention will be apparent to those skilled in the art, and I desire it to be understood that I aim in the appended claims to cover all such modifications which do not depart from the spirit and scope of my invention.

What I claim as new and desire to secure by Letters Patent of the United States, is:—

1. An alternator comprising two relatively rotatable members, one of the members having an annular face provided with teeth on a fractional part only thereof, the other of the members having poles arranged adjacent said one member and spaced apart such that one pole is opposite a tooth when another pole is opposite a space between two teeth, windings on said poles and means for producing flux through said poles and teeth, whereby relative movement of said members causes alternating current voltages to be induced in the windings at successive intervals.

2. An alternator comprising a rotor having its periphery divided into toothed and substantially smooth portions, a stator having a pair of poles adjacent said face and spaced apart so that when one pole is opposite a tooth of the rotor the other pole is opposite a space between two teeth, windings on said poles and a field winding for producing a flux between the poles of the stator and the rotor.

3. An alternator comprising a rotor having its periphery divided into toothed and substantially smooth portions, a stator having a pair of poles adjacent said face and spaced apart so that when one pole is opposite a tooth of the rotor the other pole is opposite a space between two teeth, a second pair of similar poles displaced from the first pair of poles substantially the length of one of said portions, windings on said poles and a field winding for producing a flux between the poles of the stator and the rotor.

4. An alternator comprising a rotor having its periphery provided with teeth in certain portions and substantially smooth in other portions, a stator surrounding the rotor, a pair of poles on the stator spaced such that when one pole is opposite a tooth of the rotor the other pole is opposite a space between teeth, a second similar pair of poles on the stator circumferentially displaced from the first pair of poles a distance corresponding to the length of a smooth portion of the rotor, windings on said poles, and a field winding for producing flux through the rotor, the stator and the poles.

5. In an alternator, a frame member, a stationary member mounted therein having a pole and a winding surrounding said pole, a rotatable member having teeth with spaces therebetween on its periphery, said teeth and spaces extending over a portion only of its periphery, means engaging said frame and said stationary member for adjusting the air gap between said pole on the stationary member and said rotatable member, and means for producing flux through said pole on the stationary member and the teeth on the rotatable member, the rotation of said rotatable member producing an alternating current voltage in said winding during a portion of each revolution of said rotatable member and no voltage in said winding during another portion of each revolution of said rotatable member.

6. In an alternator, a frame member, a stationary member mounted therein having poles spaced apart and windings surrounding said poles, a rotatable member having teeth with spaces therebetween on its periphery, said last mentioned teeth and spaces extending over a portion only of its periphery, the remainder of said periphery being smooth and cylindrical in form, the distance between the poles on the stationary member being substantially equal to the smooth portion of the periphery of the rotatable member, means engaging said frame and said stationary member for adjusting the air gap between said poles on the stationary member and said rotatable member, and means for producing flux through said poles and teeth, the rotation of said rotatable member producing an alternating current voltage in one of said windings and no voltage in the other of said windings during a portion of each revolution of said rotatable member.

In witness whereof, I have hereunto set my hand this 9th day of January 1925.

FRANK W. MERRILL.